United States Patent [19]

Hatomoto et al.

[11] Patent Number: 5,009,946

[45] Date of Patent: Apr. 23, 1991

[54] COMPOSITE SHEET FOR AUTOMOTIVE USE

[75] Inventors: Isamu Hatomoto, Nishinomiya; Yoshiteru Matsuo, Kurashiki, both of Japan

[73] Assignees: Kuraray Company Limited, Kurashiki; Honda Giken Kogyo Kabushiki Kaisha, Tokyo, both of Japan

[21] Appl. No.: 449,419

[22] Filed: Dec. 15, 1989

Related U.S. Application Data

[63] Continuation-in-part of Ser. No. 161,103, Feb. 26, 1988, abandoned.

[30] Foreign Application Priority Data

Mar. 3, 1987 [JP] Japan ................................ 62-49862

[51] Int. Cl.$^5$ .......................... B32B 5/24; B32B 5/30; B32B 7/02; B32B 33/00
[52] U.S. Cl. ..................... 428/87; 428/91; 428/95; 428/229; 428/242; 428/244; 428/252; 428/372; 428/374; 428/922; 57/203; 57/238; 57/901; 57/905
[58] Field of Search .............. 428/87, 91, 95, 229, 428/242, 244, 252, 922

[56] References Cited

PUBLICATIONS

Japanese Utility Model No. 60-40497 (1985).

*Primary Examiner*—James C. Cannon
*Attorney, Agent, or Firm*—Oblon, Spivak, McClelland, Maier & Neustadt

[57] ABSTRACT

There is described a composite sheet includes a textile layer containing an electrically conductive fiber with an electric resistance of $10^5$ to $10^9$ ohms/cm as disposed at spaced intervals not exceeding 30 mm and a semiconductive layer with a surface resistivity of $10^6$ to $10^{10}$ ohms as disposed on the reverse side of the textile layer. This composite sheet releases the static electricity of the charged body on mutual contact and is therefore suitable for use as a car upholstery material and particularly as a seat covering material.

3 Claims, 3 Drawing Sheets

COMPOSITE SHEET FOR AUTOMOTIVE USE

This application is a continuation-in-part of application Ser. No. 07/161,103, filed on Feb. 26, 1988, now abandoned.

BACKGROUND OF THE INVENTION

The present invention relates to automotive textile sheets and more particularly to an automotive upholstery sheet which has antistatic and static-eliminating properties.

DISCUSSION OF BACKGROUND

It is well known that on rising from the driver's seat of a car after driving, one is striken with a static shock. This shock occurs as the high static potential build up on the human body due to repeated friction against the car upholstery material, such as the driver's seat cover, is rapidly released in a burst when one contacts an electrically conductive material. This rapid, momentary release of a large static electricity is known as a spark discharge.

For an antistatic treatment of textile products, it has been known to incorporate an electrically conductive fiber in the textile construction by way of weaving or knitting. Such electrically conductive fiber serves to collect the static electricity within the textile product and discharges it as a corona discharge from its terminal ends to release the static charge from the textile product. However, the resulting corona discharge (static elimination) effect is not sufficient enough to render the product fully suitable for use as a car upholstery material. Furthermore, the static accumulating (capacitance) effect of the conductive fiber itself is also very low. Therefore, a car seat covered with such a textile product is hardly expected to eliminate the static electricity of a human body charged to a high potential through the grounding.

To overcome this disadvantage, there has been proposed a static-eliminating seat material comprising a textile web containing an electrically conductive fiber and a grounded conductive backing layer (with a surface resistivity not over $10^6$ ohms) containing 20 to 50% of finely divided carbon powder (Japanese Utility Model No. 60-40497).

However, for use as the surfacing material of a car seat, such a sheet has the following disadvantage. Thus, if the sheet and the human body are in constant contact, the static electricity on the sheet and body flows steadily to the automotive chassis through the conductive fiber and backing layer so that the static potential on the sheet and human body is not increased but when the body is separated from the seat, the elimination route for the static electricity on the body side is interrupted so that the body remains charged to a high potential, with the result that a severe spark discharge takes place as the body recontacts with the seat. The same phenomenon occurs when the human body charged to a high potential by some other cause comes into contact with the car seat. This is similar to the spark discharge which takes place when the human body charged to a high potential contacts a good electrical conductor such as a metallic object. Therefore, this prior art sheet cannot be a satisfactory upholstery material for automotive use.

SUMMARY OF THE INVENTION

It is an object of the present invention to provide an automotive upholstery material, particularly a composite textile sheet suitable for use as a car seat surfacing material which is adapted to lower the potential of a charged body, such as a human body charged to a high static potential in the car, to a level below the spark discharge potential even before contact therewith and to release the static charge rapidly after the contact.

Another object of the present invention is to provide a composite textile sheet which has the anti-static and static-eliminating properties required of a car upholstery material and the flexibility required of a car seat surfacing material.

The present invention is therefore directed to a composite textile sheet having antistatic and static-eliminating properties which comprises a textile layer containing an electrically conductive fiber with an electrical resistance of $10^5$ to $10^9$ ohms/cm at spaced intervals not more than 30 mm and a semiconductive layer disposed on the reverse side of said textile layer and having a surface resistivity of $10^6$ to $10^{10}$ ohms, said conductive fiber contacting said semiconductive layer or preferably integrally formed with the reverse surface of said semiconductive layer. And where a conductive layer is not integrally disposed on the reverse side of a semiconductive layer, it is necessary that the semiconductive layer be electrically connected to a conductor, which permits the static electrically connected to a conductor, which permits the static electricity flown into the semiconductive layer to instantaneously flow to the conductor, thus eliminating static charges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
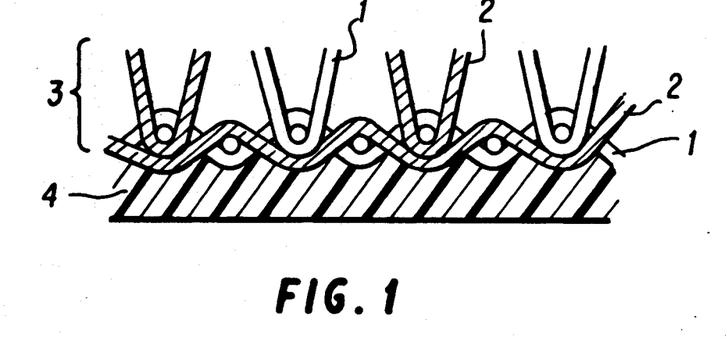
FIG. 1 is a cross-section view showing a composite textile sheet product according to the present invention where a moquette fabric is used as the textile layer.
Figure 2:
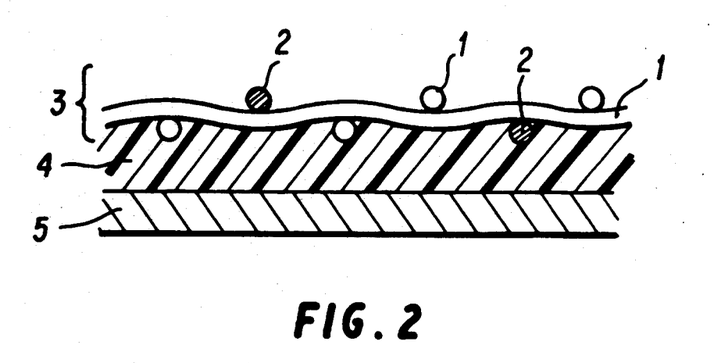
FIG. 2 is a cross-sectional view showing composite textile sheet products according to the present invention where the textile layer is a woven fabric having a smooth surface.

Referring now to the drawings, wherein like reference numerals designate identical or corresponding parts throughout the several views, and more particularly to FIGS. 1 and 2 thereof, there are illustrated cross-section views showing composite textile sheet products having antistatic and static-eliminating properties as provided by the present invention, wherein FIG. 1 is a schematic view showing an embodiment in which a moquette fabric is used as the textile layer while FIG. 2 is a schematic view showing an embodiment in which a woven fabric having a smooth surface is used as the textile layer.

In these views, 1 represents an ordinary, yarn, 2 a pile or ground yarn containing an electrically conductive fiber as mixed-spun or mix-twisted and having a diameter not more than 50 μm, 3 a textile layer, 4 a semiconductive layer, and 5 an electrically conductive layer. In use, the sheet illustrated in FIG. 1 is disposed on a grounded conductor, while the one illustrated in FIG. 2 is used with its conductive layer grounded.

Figure 3:
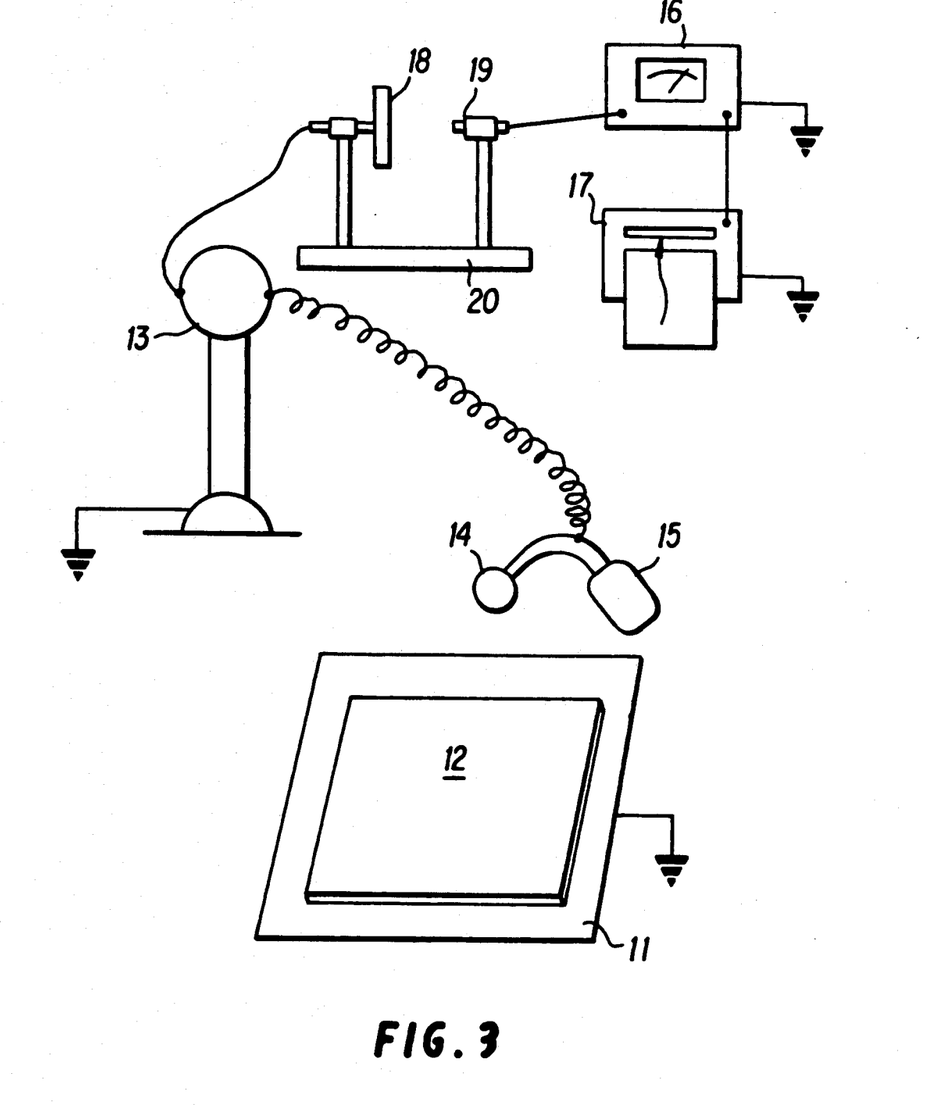
FIG. 3 illustrates an apparatus used in the evaluation of the anti-static and static-eliminating performance of textile sheets.

FIG. 3 is a diagrammatic view showing an apparatus for use in the evaluation of the antistatic and static-eliminating performance of sheets. As illustrated, a sample 12 (20 cm×20 cm) to be evaluated is placed on an earth plate 11 and the free end of a discharge bulb 14 boosted to 5 KV by an electromotive device 13 is contacted with the surface of the test sample 12. The potential of the discharge bulb is then measured. The measuring environment is controlled at 22° C. and 20% R.H. Referring further to FIG. 3, 15 represents an insulator, 16 a potentiometer, 17 a recorder, 18 an electrode, 19 a probe, and 20 an insulator.

Figure 4:
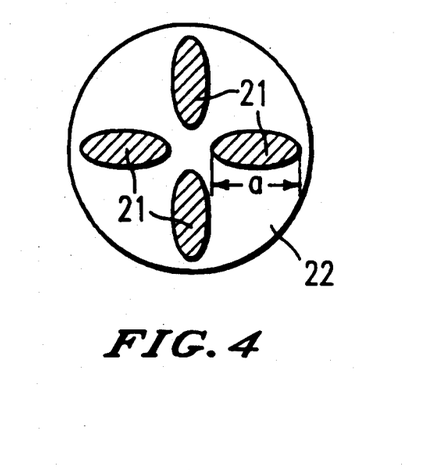
Figure 5:
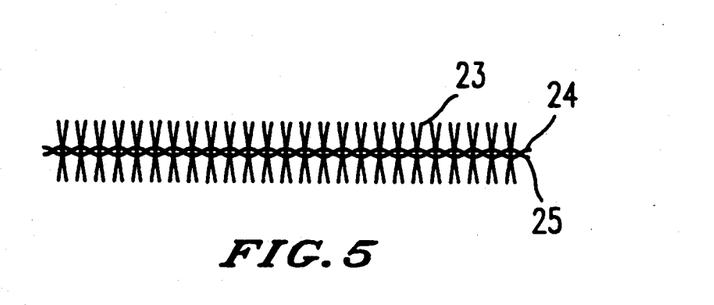
Figure 6:
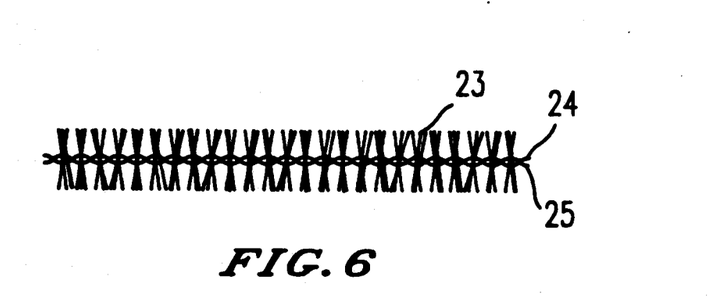

FIG. 4 is a cross-sectional view of an example of the preferred conductive fiber used in the present invention. In the figure, 21 represents a core component comprising a polymer containing a conductive powder, and 22 a sheath component comprising a polymer substantially not containing any conductive powder. FIGS. 5 and 6 show examples of chenille yarns utilizing a conductive fiber, wherein 23 represents effect filaments, 24 holding yarn and 25 core yarn. FIG. 5 shows the case where the effect fiber is composed only of a conductive fiber, and FIG. 6 the case where the effect fiber is a combined filament yarn consisting of a conductive fiber and a second fiber.

Reference is first of all made to the textile layer of the composite sheet product according to the present invention, this textile layer is a knitted, woven, or nonwoven fabric made up of, predominantly, an ordinary synthetic fiber and, partially, an electrically conductive fiber as mixed into the textile layer as at least a part of warp yarn, filling yarn or pile yarn or in the form of a mix-twist yarn.

The electrically conductive fiber to be employed in the present invention may for example be a synthetic polymer fiber containing a conductive powder such as carbon powder or metal powder or a composite fiber consisting of a polymer containing a conductive powder and a polymer substantially not containing a conductive powder. A chemical fiber having a metal-plated surface, a fiber having a metal powder precipitated therein, and a fine-gage metal wire are also known as electrically conductive fibers but since such fibers generally have electrical resistivities less than $10^5$ ohms/cm, they cannot be generally employed for the purposes of the invention from the standpoint of electrical resistance. In order to preserve the aesthetic quality and desirable handle of the textile material and also to accomplish the aforesaid objects of the invention, it is useful to employ a composite fiber in which a polymer containing a conductive powder is enclosed by a polymer substantially not containing a conductive powder. While carbon is most popular among conductive powders, it causes, when used for a conductive fiber, the fiber to turn black, which will then be visually too distinct when contained in light-color fabrics and such fabrics can hence not be used for seat covering materials. For this reason the preferred conductive fibers must be white or nearly white, and the conductive powder to be contained should hence preferably be a white compound, particularly white pigment covered with a metal oxide. Typical example of the white pigment is titanium oxide powder, and examples of the metal oxide to cover the surface of the white pigment particles are zinc oxide and stannic oxide. It is preferred for the purpose of keeping white color and conductivity that the metal oxide be coated on a white pigment in an amount of 5 to 55% by weight based on the weight of the pigment. However, zinc oxide or stannic oxide alone cannot give a sufficient conductivity, and it is necessary to add a different metal compound as a conductivity increasing agent in an amount of 50% by weight or below based on the amount of the above-mentioned metal compound, i.e. zinc oxide or stannic oxide. For example, antimonium oxide or aluminum oxide is preferably added to stannic oxide or zinc oxide. Among the above-described white conductive powders, particularly preferred is one comprising titanium oxide covered with a conductive layer principally containing zinc oxide or stannic oxide incorporating antimonium oxide as a conductivity increasing agent. The white conductive powders preferably have an average diameter (median diameter) of 0.02 to 0.5 micron for the purpose of assuring spinnability as well as whiteness.

For the preparation of preferred conductive fibers, the above-mentioned conductive powder is kneaded into a resin having high affinity thereto, for example polyamide resin, and the obtained resin composition is used as the core component with the sheath component of a second resin having fiber-forming ability and high resistance to light, for example polyester resin such as polyethylene terephthalate or polybutylene terephtalate to form a sheath-core composite fiber. The composite fiber thus prepared will exhibit the conductivity over a long period of time, have resistance to light, and provide a nice hand to the textiles comprising it. In this case the conductive powder is incorporated in the core component in an amount of preferably 60 to 80 wt %.

Further the sheath-core composite fiber may be of single core but is preferably of multicores having 2 to 7 cores, since, then, the core component be present closer to the surface of the fiber, thereby decreasing the breakdown voltage. For the purpose of enhancing the effect of collecting static charge, it is preferred that the cores of such multicore composite fiber have a flat cross section as shown in FIG. 4, with their major axes (designated by "a" in FIG. 4) extending in the direction of the fiber radius, in other word, being on radial lines starting at the center of the fiber cross section.

In the sheath-core composite fiber, the ratio by area of the core component to the sheath component is preferably in the range of from 25:75 to 2:98 for the purpose of assuring a sufficient conductivity, fiber strength and durability of the conductivity. The conductive fiber for car seat materials preferably has a diameter not exceeding 50 μm, and most preferably has a fineness of 5 to 20 deniers. The conductive fiber is preferably in the filament form. Furthermore, in terms of attractive appearance and handle, it is advantageous to use such a conductive fiber in combination with one or more other kinds of fibers in the manner of mix-spinning or mix-twisting, rather than to use it alone.

For an effective collection and subsequent elimination of static charge, the conductive fiber preferably has an electric resistivity not exceeding $10^9$ ohms/cm. However, if the electric resistivity is less than $10^5$ ohms/cm, an electric shock is liable to take place. Therefore, in the practice of the invention, a conductive fiber having a resistance value in the range of $10^9$ to $10^5$ ohms/cm is employed. The electric resistivity of a synthetic polymer fiber containing a carbon or metal powder or a composite fiber containing such a polymer is, of course, dependent on the amount of the conductive powder incorporated. Therefore, it is necessary that the level of addition of conductive powder be controlled within the above-mentioned resistance range.

It is not necessary to use a mix-spun or mix-twisted fiber consisting of a conductive fiber and other fiber throughout the textile construction but it is sufficient that the conductive fiber accounts for 0.05 to 5.0 weight % of the total fiber content. If the proportion of the conductive fiber is less that 0.05 weight percent, however, the resulting static charge collection and corona discharge effect will be insufficient. If, conversely, the proportion is over 5.0 weight percent, the effect will not be greater as it reaches a saturation point.

It is an important feature of the present invention that the conductive fiber is available with at least a certain density on the surface of the semiconductive layer. For this purpose, the conductive fiber must be disposed, for example by mix-weaving or mix-knitting as warp yarn, filling yarn or pile yarn, at spaced intervals not exceeding 30 mm. The presence of the conductive fiber in such a density on the surface of the semiconductive layer serves to lower the potential of the charged body by corona discharge just before it contacts the sheet. Thus, the conductive fiber may present a plurality of projections in the form of ribs on the surface or as upright projections. The latter arrangement is particularly desirable and, in this sense, the pile construction is preferred. Moreover, it is preferable that the conductive fiber be present both in the ground yarn (warp or filling yarn) and in the pile yarn. Moreover, to assure the above function, the conductive fiber preferably has a diameter not over 50 µm.

As stated heretofore, the conductive fiber plays a role of collector of static charge on high-potential human body, and the fiber axes of the conductive filaments contained in the textile are therefore preferably in positions perpendicular to the high-charged human. However, it is very difficult, for a conventional fabric having substantially no vertical hair, to position the fiber axes of the conductive filaments nearly perpendicular to the high-charged human. It is also very difficult for a tubular knitted fabric to position the fiber axes of the conductive filaments nearly perpendicular to the high-charged human. For the conventional fabrics having no vertical hair and tubular knitted fabrics, it is therefore preferred to use a chenille yarn containing a conductive fiber as at least part of its effect fiber or a yarn comprising such chenille yarn, as part of the weft or warp or of knitting yarn. FIGS. 5 and 6 show examples of chenille yarns; FIG. 5 utilizes as the effect fiber a conductive fiber only and FIG. 6 a conductive fiber in combination with other nonconductive fiber. As seen from the Figures, the core yarn and holding yarn of the chenille yarn extend in the same direction as that of the axis of the chenille yarn, while the effect fiber which is short-cut conductive filaments extend radially from, and perpendicular to, the yarn axis formed by the core yarn and holding yarn. Where the chenille yarn of this type is used, as part of yarns constituting a woven or knitted fabric which originally has no vertical hair, to form a woven or knitted fabric, and the fabric is then applied on its back surface with a later-described backing resin and used for car seat fabric, part of the conductive filaments contained in the chenille yarn will form nearly vertical terminals with their ends projecting from the fabric surface with the other ends being embedded in the backing layer of the fabric. Then, the car seat fabric will, when approached or contacted by a high-charged human body, collect the static charge at the ends of the conductive filaments and release it through the backing layer to a conductor connected with the backing layer.

Where woven or knitted fabrics having vertical hair on their surface, such as moquette and double Russel knit, comprise conductive filaments as part of the vertical hair, the conductive filaments extend in a direction perpendicular to the high-charged human and hence exhibit effect of collecting static charge, not requiring the use of the above-described chenille yarn. In this case, the conductive filaments are, for producing higher charge-collecting effect, preferably present as groups of a plurality of them in spots, rather than uniformly distributed, on the fabric surface. More specifically, it is preferred that the spots where a group of the vertical conductive filaments are present be each surrounded by an area of the vertical hair containing no conductive filaments and at least one such spots be contained in a hypothetical circle have a diameter of 30 mm drawing at any place on the fabric surface. Moreover, it is preferred for assuring effects of both collecting and releasing static charge that each of such spots contain in an average 4 to 18 pieces of vertical conductive filaments projecting not from one single root but, in groups, from a plurality of roots, a group containing not more than 4 pieces of conductive filaments. The pots are preferably not distributed on the fabric surface with the distance between adjacent one being always the same, in other word it is preferred to weave the conductive filaments such that the spots containing the conductive filaments be distributed with uneven distances between any two adjacent ones. Such consideration is however not necessary where, as afore-described, a conductive chenille yarn is used as part of the weft or warp of a woven fabric or as part of the knitting yarn of a tubular knit fabric, since in these cases the conductive filaments constituting the chenille yarn are necessarily present as groups and nonuniformly on the fabric surface.

The semiconductive layer in the composite sheet of the invention is formed by coating the reverse side of the textile layer with a semiconductor backing material or by laminating a semiconductive film with the textile layer. The backing material is an ordinary backing resin or rubber material in which a carbon, metal or other conductive powder has been finely dispersed. The semiconductive film is also a film containing such a conductive powder dispersed therein.

It is necessary that the semiconductive layer have a surface resistivity of $10^6$ to $10^{10}$ ohms. If the surface resistance value is over $10^{10}$ ohms, the static charge is not readily eliminated on contact with the charged body. If the surface resistivity is less than $10^6$ ohms, this layer becomes so close to a conductive layer that depending on the potential level of the charged body, a spark discharge may be induced on contact. The backing material can easily be prepared by dispersing 5 to 12 weight percent of a carbon powder or the like in an ordinary backing resin based on the solid content of the pure resin. The semiconductive film can also be obtained similarly. Generally, when a conductive powder is added to a resin, the resulting resin layer has a flexibility nearly half that of the resin so that a seat covered with such a material offers a poor seating quality. To prevent this, it is advantageous to form the resin layer by foam-coating or mesh coating (inclusive of dot, linear or screen-mesh coating).

In the present invention, it is necessary that the conductive layer be in contact with the semiconductive layer. If the two layers are not contacted, the static electricity accumulated in the textile layer is not effectively discharged as a corona discharge and, at the same time, the effect of leakage into the semiconductive layer is also decreased. For assuring this effect of leakage of static charge into the semiconductive layer, it is preferable that the electric resistance of the conductive fiber be lower than the surface resistivity of the semiconductive layer.

In the present invention, the static charge of the sheet as collected from the charged body is preferably released through grounding. For this purpose, it is preferable to dispose a conductive layer having a surface resistivity not exceeding $10^6$ ohms integrally on the reverse side of the sheet consisting of said textile layer and semiconductive layer. This conductive layer may be a conductive film, a conductive textile web, a metal sheet or a metal plate.

When a highly charged body, such as a human body, is about to contact the surface of the composite sheet of the present invention, the static electricity of the charged body is collected by the conductive fiber of the textile layer and the potential of the body is decreased. Since the sheet of the invention as a whole is not a conductive material and allows static electricity to flow only gradually and does not discharge it at once, there occurs no spark discharge. And when the charged body contacts the surface of the sheet, the residual static electricity of the charged body flows through the conductive fiber to the semiconductive layer much more slowly than it is the case with a conductive material and is eliminated through the grounding. Therefore, as a highly charged body comes into contact with the composite sheet of the invention, the static charge is rapidly eliminated from the charged body without inducing the shock and noise of a spark discharge or other undesirable effects. Where the potential of the charged body is initially low, the static charge is readily eliminated upon contact with the sheet.

The composite sheet of the invention itself has an antistatic effect owing to the incorporation of conductive fiber and because of this feature and, the above-mentioned static-eliminating feature, the object such as a human body in contact with the sheet of the invention is not charged to any significant potential level.

Thanks to the above-mentioned functions, the composite sheet according to the present invention can be used advantageously as a car upholstery material such as a seat surfacing material, door lining material, instrument panel sheet or the like and particularly as a surfacing material for the car seat.

EXAMPLE 1

To confirm the effects of the invention, the following samples were fabricated and evaluated. Sample A was prepared as follows. A polyester moquette was constructed using a 20-denier composite conductive yarn (the diameter of monofilament 32 μm)(electric resistance $10^7$ ohms/cm) having a sectional configuration such that a nylon polymer containing 26.5 weight % of acetylene black was surrounded by a polyester polymer not containing a conductive powder in a density of one filament per 2 cm of pile yarn and one filament per 2 cm of warp yarn (the proportion of the conductive yarn relative to the total weight of the textile material was 0.09 wt. %). Then, the reverse side of the fabric was backed with a semiconductive layer having a surface resistivity of $4.4 \times 10^6$ ohms (1.7 wt. % of carbon powder dispersed in backing resin) In this composite sheet, the conductive fiber was in contact with the backing layer. Sample B was prepared by backing the textile layer of Sample A with an ordinary backing layer (non-conductive layer). Sample C was fabricated by backing a conductive fiber-free textile layer with an ordinary backing layer. Sample D was fabricated by backing the textile layer of Sample A with a conductive backing layer having a surface resistivity of $10^4$ ohms (30 wt. % of carbon powder dispersed in backing resin) (the conductive fiber was in contact with the backing layer). The relative static-eliminating performance of these samples was evaluated. The results are shown in Table 1. For the evaluation, the apparatus illustrated in FIG. 3 was used.

TABLE 1

| | Attenuation of the potential of a discharge bulb. | | | |
|---|---|---|---|---|
| | Brief | Potential of discharge bulb | | |
| Sample | description of sample | Immediately after contact | 10 seconds after contact | Remarks |
| (A) (Invention) | Antistatic textile layer plus semi-conductive backing | 1.5 KV | 1.4 KV | |
| (B) (Control) | Antistatic textile layer plus non-conductive backing | 4.2 KV | 2.9 KV | |
| (C) (Control) | Ordinary textile layer plus non-conductive backing | 4.9 KV | 4.7 KV | |
| (D) (Control) | Antistatic textile layer plus conductive backing | 0 KV | — | Marked spark discharge |

Using each of these Samples A through D as a car seats were fabricated. After each of these car seats was set in the car, a tester wearing a polyester shirt and a pair of polyester trousers was instructed to sit on the seat and reciprocate his waist from right to left and vice versa 10 times each in a period of 10 seconds to cause a friction between the clothes and the seat. Then, the tester rose from the seat and the electric potential of the body was measured. The results were as follows.

Sample A—3.4 KV
Sample B—8.6 KV
Sample C—9.0 KV
Sample D—3.3 KV

With Samples B and C, a large electric shock occurred when the tester rose from the seat and contacted an electrically conductive (metal) object. In the case of Sample D, the tester felt a large electric shock when he rose from the seat. In the case of Sample A, the tester felt only a faint electric shock when he rose up and touched a conductive object.

CONTROL EXAMPLES

A composite sheet was fabricated in the same manner as Sample A except that a fine-gage stainless steel filament (15μ) with a resistance value of 10 ohms/cm was used in lieu of the conductive fiber. When this sheet was used as the surfacing material of a car seat, the capacitance effect caused a large electric shock.

A composite sheet was fabricated in the same manner as Sample A except that the acetylene black content of the conductive fiber was controlled to 20 weight %. This conductive fiber had a resistance value of $10^{10}$ ohms/cm. With this sheet, the leakage of the potential of the human body was so slow that substantially no static-eliminating effect was obtained.

EXAMPLE 2

A composite sheet was fabricated in the same manner as Sample A except that the semiconductive layer was prepared by coating the reverse side of the textile layer with a pre-foamed resin solution containing 2.0 weight % of carbon black and drying the coat. The air cell content of the semiconductive layer was 65 volume % and the thickness of the same layer was 95 g/m$^2$. Using this sheet, a car seat was fabricated. This seat was as satisfactory as Sample A in terms of antistatic and static-eliminating properties. Moreover, the sheet itself was very flexible and soft, providing a very good seating quality.

Thus, when the composite sheet of the invention is used as a car upholstery material such as a seat cover, the potential of the charged body is decreased to a level not causing a spark discharge before the body comes into contact with the sheet and, then, is eliminated quickly so that the electric shock due to static charge is effectively prevented.

EXAMPLE 3

A plurality of sheath-core composite conductive filaments having a cross section as sown in FIG. 4 and a core-sheath ration by volume of 13/87 were prepared from a core component of a resin composition comprising a kneaded mixture of 65 parts by weight of a conductive powder having an average diameter of 0.2 which contains titanium dioxide particles coated with stannic oxide on the surface thereof and antimonium oxide (the ratio of titanium dioxide/stannic oxide/antimonium oxide: 85/13/2) and 35 parts by weight of nylon-6 and a sheath component of polyethylene terephtalate. The filaments were each double into multifilament yarns of 25 deniers/2 filaments (electric resistance: 10% ohms/cm). The conductive yarn thus obtained was combined with a 30-denier polyester monofilament to give a reinforced dielectric yarn having an overall fineness of 55 deniers and this yarn was used as an effect yarn together with a 30/2 poly-ester spun yarn. A dielectric chenille yarn as shown in FIG. 6 having a fineness of 21/4 (2,250 deniers) and containing 4% by weight of the conductive filament was prepared from the above effect yarn and a holding yarn of 30/2-polyester spun yarn and a 75-denier polyester multifilament yarn having a low melting point, and then the low-melting-point polyester yarn was fused. The chenille yarn thus prepared held tight the effect yarn filaments and did not allow them to slip off. The dielectric chenille yarn was woven into a polyester fabric (warp: 30/2 polyester spun yarn, 96 pieces/inch; weft: 1,000-denier polyester core-wrapped composite textured yarn, 38 pieces/inch) between the wefts at 1-cm intervals. The fabrics was coated by knife coating on the reverse side thereof with a backing layer comprising a polyacrylate emulsion incorporating a curing agent and 9.0 wt % of carbon powder based on the dry weight of the resin. The car seat material thus obtained was evaluated for the static eliminating property by using the apparatus shown in FIG. 3. The potential of the discharge bulb was 1.2 KV just after contact, and 1.1 KV after 10 seconds after the contact, which results show that the material was excellent in effects of collecting and eliminating static charge and caused no spark discharge. The material was used as a car seat and a tester was measured, in the same manner as in Example 1, for this potential at the moment he rose from the seat to give 2.9 KV. He did not feel any electric shock when he contacted a conductive object. This car seat did not cause, not depending on the color of the seat, the conductive filament yarn to be visually distinguished and, besides, exhibited a soft, high-grade feeling.

EXAMPLE 4

A moquette having a vertical hair length of a 2 mm and density of 12,300 pieces/cm$^2$ was prepared using the conductive filaments obtained in Example 3 as part of the warp. The moquette contained 0.4 wt % of its vertical hair of the conductive filaments and 99.6 wt % 170-denier polyester multifilament yarn. In the moquette, the conductive filaments were present in groups each containing 8 vertical filaments, which groups being irregularly distributed on the moquette surface with the distance between two neighboring groups of 1.5 to 2.5 cm. The 8 pieces of vertical conductive filaments in each of the groups rose from 2 roots, 4 pieces rising from one root. Each of the groups had a size, as seen on the raised surface, well contained in a hypothetical circle having a diameter of about 5 mm. The reverse side of the moquette was backed in the same manner as in Example 3 to give a car seat material. The material thus obtained was evaluated for the static eliminating property in the same manner as in Example 3. The potential of the discharge bulb was 1.3 KV just after contact, and 1.1 KV 10 seconds after the contact, which results show that the material was excellent in effects of collecting and eliminating static charge and caused no spark discharge. The material was used as a car seat and a tester was measured, in the same manner as in Example 1, for his potential at the moment he rose from the seat to give 3.1 KV. He felt almost no electric shock when he contacted a conductive object. This car seat did not cause, not depending on the color of the seat, the conductive filaments to be visually distinguished and, besides, was a neat-looking fluffed product having a high-grade feeling.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. A composite automotive upholstery sheet having antistatic and static-eliminating properties which comprises a textile layer containing an electrically conductive fiber with an electric resistance of $10^5$ to $10^9$ ohms/cm and a backing semiconductive layer with a surface resistivity of $10^7$ to $10^{10}$ ohms integral and in contact with said textile layer;

said textile layer being:
a woven or knitted fabric originally having substantially no vertical hair on the surface thereof, comprising as part of its constituting yarns a chenille yarn containing said conductive fiber as at least part of the effect yarn of said chenille yarn, said chenille yarn being present on said fabric at spaced intervals not exceeding 30 mm; or a woven or knitted fabric having vertical hair, comprising said conductive fiber as groups of 4 to 18 pieces of vertical conductive filaments distributed on the fabric surface in spots, at least one such spot being present in any hypothetical circular area having a diameter of 30 mm drawn on the fabric surface; and said conductive fiber being a sheath-core composite fiber comprising as the core component a resin composition which comprises a resin and a conductive powder comprising titanium dioxide particles coated on the surface thereof with a conductive metal oxide and as the sheath component a polyester.

2. A composite automotive upholstery sheet according to claim 1, wherein said conductive powder is titanium dioxide particles coated on the surface thereof with stannic oxide or antimonium oxide.

3. A composite automotive upholstery sheet according to claim 1, wherein said conductive fiber is a multi-core sheath-core composite fiber, said cores having a flat cross section and being distributed in the fiber cross section radially with their major axes extending in the radial directions of the fiber cross section.

* * * * *

UNITED STATES PATENT AND TRADEMARK OFFICE
CERTIFICATE OF CORRECTION

PATENT NO. : 5,009,946

DATED : April 23, 1991

INVENTOR(S) : Hatomoto et al

It is certified that error appears in the above-identified patent and that said Letters Patent is hereby corrected as shown below:

In column 11, line 6, change "integral" to --integrally--.

Signed and Sealed this

Eighth Day of December, 1992

Attest:

DOUGLAS B. COMER

*Attesting Officer*   *Acting Commissioner of Patents and Trademarks*